2,748,155
Patented May 29, 1956

2,748,155
PROCESS FOR PREPARING MERCAPTO-ALKYL CYANIDES

John D. Wordie, Fullerton, Calif., assignor to The Texas Company, New York, N. Y., a corporation of Delaware No Drawing. Application April 9, 1953,
Serial No. 347,841

5 Claims. (Cl. 260—465.1)

This invention relates to a process for preparing 2-mercapto-alkyl cyanides by reaction between an alkenyl cyanide and hydrogen sulfide. More particularly, this invention relates to a procedure whereby the reaction of a 1-alkenyl cyanide with hydrogen sulfide can be controlled so as to produce a reaction product comprising mainly 2-mercapto-alkyl cyanide.

Prior to this invention, the reaction of a 1-alkenyl cyanide with hydrogen sulfide yielded a reaction product comprising mainly a cyanoalkyl sulfide. The production of cyanoalkyl sulfides by the addition of hydrogen sulfide to 1-alkenyl cyanides is illustrated by the base-catalyzed reaction of acrylonitrile with hydrogen sulfide to produce 2-cyanoethyl sulfide; this reaction is described in the Journal of the American Chemical Society, 69, 241, 1947, and is illustrated by the following equation:

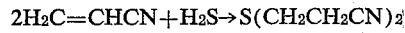

$$2H_2C{=}CHCN + H_2S \rightarrow S(CH_2CH_2CN)_2$$

Although it has been postulated that 2-mercaptoalkyl cyanides are intermediates in the formation of cyanoalkyl sulfides, prior investigators have been unable to control the reaction between hydrogen sulfide and a 1-alkenyl cyanide to obtain a 2-mercapto-alkyl cyanide as the major reaction product. Prior to this invention, it was necessary to resort to a two-stage process to obtain substantial quantities of 2-mercapto-alkyl cyanide; the two-stage process involved base-catalyzed addition of thioacetic acid to a 1-alkenyl cyanide to give a thioester which, on saponification, yielded a 2-mercapto-alkyl nitrile. This invention involves the discovery that 2-mercapto-alkyl cyanides are obtained as the major product of non-catalytic reaction between hydrogen sulfide and 1-alkenyl cyanides by close control of reaction conditions and of the order in which the reactants are charged to a reaction vessel.

In accordance with the process of this invention, 2-mercapto-alkyl cyanides are the major reaction product obtained by a non-catalytic process in which hydrogen sulfide is charged to a reaction vessel at a pressure between 100 and 500 p. s. i. g. and a 1-alkenyl cyanide is added to the hydrogen sulfide while the temperature is maintained below about 75° C. Addition of the 1-alkenyl cyanide to hydrogen sulfide is a reversal of the normal procedure for reaction between a gas and a liquid and causes the reaction of hydrogen sulfide and a 1-alkenyl cyanide to yield mainly a 2-mercapto-alkyl cyanide when the prescribed temperature and pressure conditions are observed.

The process of the invention is applicable to 1-alkenyl cyanides containing from 2 to 20 carbon atoms in the alkenyl group, but 1-alkenyl cyanides containing less than 12 carbon atoms in the alkenyl group are the preferred charge materials. Acrylonitrile, 1-propenyl cyanide, 1-pentenyl cyanide, 1-decenyl cyanide and 1-butenyl cyanide are examples of the preferred class of charge materials. Alkadienyl cyanides in which one of the double bonds is adjacent to the —CN group may also be employed to yield 2-mercapto-alkenyl cyanides; examples of alkadienyl cyanides that may be employed are 1,5-hexadienyl cyanide and 1,4-heptadienyl cyanide.

It is necessary to maintain a temperature below about 75° C. in order to obtain a 2-mercapto-alkyl cyanide as the major product of reaction between an alkenyl cyanide and hydrogen sulfide. At temperatures above 75° C., a cyanoalkyl cyanide is the major reaction product even when the alkenyl cyanide is added to the hydrogen sulfide in the absence of a catalyst. Temperatures between 10 and 50° C. are preferred for the non-catalytic reaction.

A pressure range of 100 to 500 p. s. i. g. is prescribed for the reaction of hydrogen sulfide and a 1-alkenyl cyanide to produce mainly 2-mercapto-alkyl cyanide. Usually, pressures between 200 and 400 p. s. i. g. are employed.

As long as the prescribed reaction conditions and mode of reactant addition are observed, 2-mercapto-alkyl cyanides are the predominant reaction product. However, it is advisable to limit the reaction time to less than five hours in batch operations in order to prevent further reaction of the 2-mercapto-alkyl cyanide.

The process of the invention is illustrated in the following examples wherein 2-mercapto-alkyl cyanides are obtained as the major reaction product by adding alkenyl cyanide to hydrogen sulfide in the absence of a catalyst.

Example I 952 g. (28 mols) of hydrogen sulfide was charged to a stirred stainless steel pressure reactor with the development of a pressure of 220 p. s. i. g. 371 g. (7 mols) of acrylonitrile was then added to the hydrogen sulfide with stirring over a period of 90 minutes using nitrogen pressure to force the acrylonitrile into the reaction vessel. After all the acrylonitrile was added, the reaction mixture was stirred for three hours during which time the temperature reached a maximum of 45° C. and the pressure attained a maximum of about 325 p. s. i. g. After the excess hydrogen sulfide was vented, the liquid reaction product was added to a stirred solution of 7 mols of sodium hydroxide in 2,500 cc. of water while the temperature was maintained below 30° C. The aqueous alkaline layer was extracted with ether to separate cyanoethyl sulfide and unreacted acrylonitrile. The aqueous raffinate was acidified with hydrochloric acid and neutralized with sodium bicarbonate; the acidified neutralized product was then extracted with ether. On distillation of the ether extract, there was obtained 213 g. of 2-mercapto-propionitrile which is a yield of 35 per cent.

Example II 530 g. of hydrogen sulfide was charged at a temperature of 19° C. to a pressure reactor of the type described in Example I with the resulting development of 200 p. s. i. g. 212 g. of acrylonitrile was slowly forced in the stirred reactor with nitrogen pressure over a one-hour period. After all the acrylonitrile had been added, the temperature had reached 36° C. and the pressure was at the 265 p. s. i. g. level. After the reaction mixture was stirred for 3½ hours, excess hydrogen sulfide was vented. The reactor contents were washed out with ether and added to a cooled solution of 160 g. of sodium hydroxide in 2 liters of water. On addition of more ether to the mixture of caustic and reaction product, 3 layers were formed; the bottom layer was an aqueous caustic solution; the middle layer comprised cyanoethyl sulfide; the top layer was an ether extract comprising unreacted acrylonitrile and cyanoethyl sulfide. The aqueous alkaline layer was acidified with hydrochloric acid and extracted with ether. The ether extract was washed with sodium bicarbonate solution until neutral, dried and distilled. On distillation of the dried ether extract, there was obtained 132 g. of 2-mercapto-propionitrile boiling at 36 to 43° C. at 0.45 mm. which is a yield of 38 per cent.

Although the process of the reaction has been illustrated by the reaction of acrylonitrile with hydrogen sulfide to yield 2-mercapto-propionitrile, it is clear that other 2-mercapto-alkyl cyanides are obtained by non-catalytic reaction of hydrogen sulfide with 1-alkenyl cyanides under the conditions prescribed in this invention.

Obviously, many modifications and variations of the invention as hereinbefore set forth may be made without departing from the spirit and scope thereof, and, therefore, only such limitations should be imposed as are indicated in the appended claims.

I claim:

1. A process for obtaining 2-mercapto-alkyl cyanides as the major product of reaction between hydrogen sulfide and 1-alkenyl cyanides which comprises charging said hydrogen sulfide to a reaction vessel, adding a 1-alkenyl cyanide containing 2 to 20 carbon atoms in the alkenyl group to said hydrogen sulfide, effecting reaction between said 1-alkenyl cyanide and hydrogen sulfide in the absence of a catalyst at a temperature less than 75° C. and at a pressure between 100 and 500 p. s. i. g. and recovering 2-mercapto-alkyl cyanide from the reaction product.

2. A process according to claim 1 in which reaction is effected between 10 and 50° C.

3. A process according to claim 1 in which reaction is effected at a pressure between 200 and 400 p. s. i. g.

4. A process according to claim 1 in which 2-mercapto-ethyl cyanide is prepared by the reaction of acrylonitrile with hydrogen sulfide.

5. The process according to claim 1 in which said 1-alkenyl cyanide contains 2 to 12 carbon atoms in the alkenyl group.

References Cited in the file of this patent
UNITED STATES PATENTS

| | | |
|---|---|---|
| 2,163,176 | Keyssner | June 20, 1939 |
| 2,413,917 | Harmon | Jan. 7, 1947 |
| 2,630,452 | Crouch et al. | Mar. 3, 1953 |